Oct. 15, 1940.   C. C. BENNETT   2,218,463
DYNAMOMETER
Filed March 17, 1938   5 Sheets-Sheet 1

INVENTOR.
CLAUDE C. BENNETT
BY
ATTORNEY.

Oct. 15, 1940.  C. C. BENNETT  2,218,463
DYNAMOMETER
Filed March 17, 1938  5 Sheets-Sheet 2

INVENTOR.
CLAUDE C. BENNETT
BY
H. O. Clayton
ATTORNEY.

Oct. 15, 1940.    C. C. BENNETT    2,218,463
DYNAMOMETER
Filed March 17, 1938    5 Sheets-Sheet 3

INVENTOR.
CLAUDE C. BENNETT
BY H. O. Clayton
ATTORNEY.

Oct. 15, 1940. C. C. BENNETT 2,218,463
DYNAMOMETER
Filed March 17, 1938 5 Sheets-Sheet 4

INVENTOR.
CLAUDE C. BENNETT
BY
ATTORNEY.

Oct. 15, 1940.                    C. C. BENNETT                    2,218,463
                                   DYNAMOMETER
                  Filed March 17, 1938            5 Sheets-Sheet 5
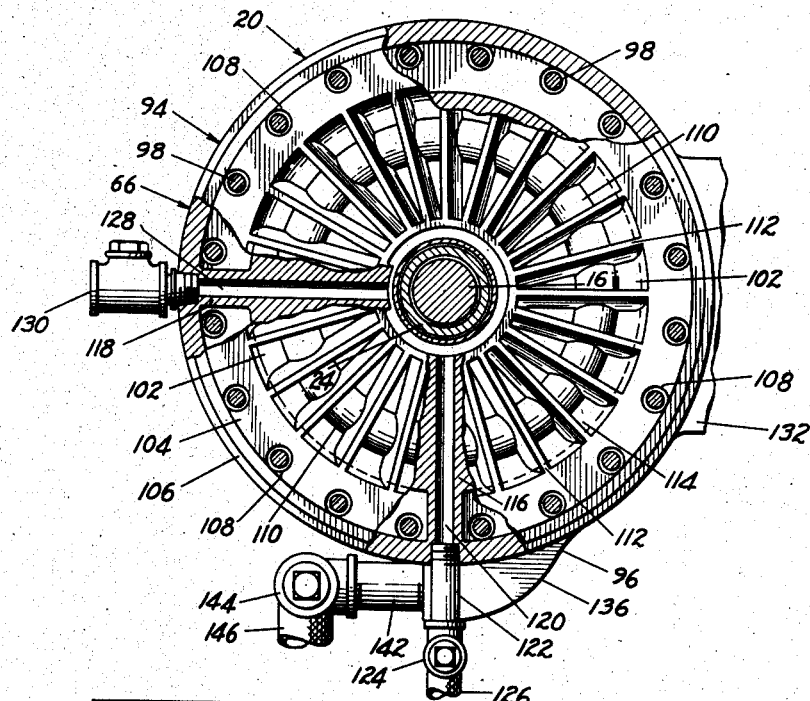
Fig. 8.
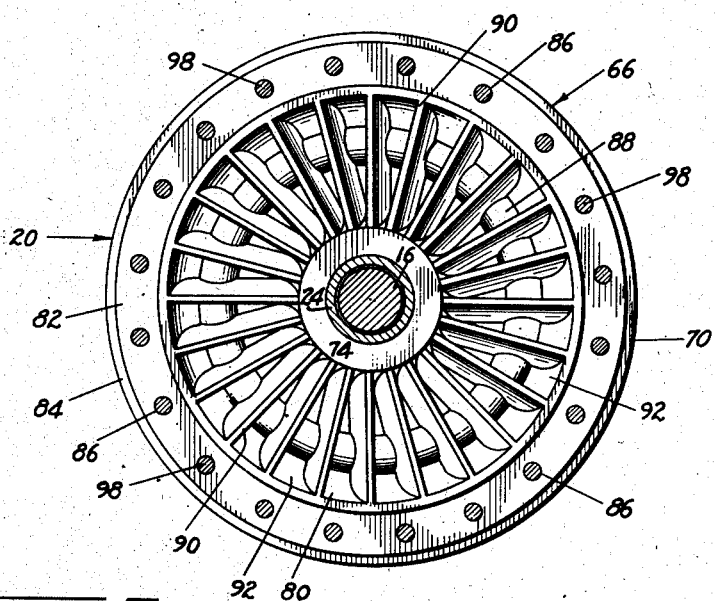
Fig. 9.
INVENTOR.
CLAUDE C. BENNETT
BY
ATTORNEY.

Patented Oct. 15, 1940

2,218,463

UNITED STATES PATENT OFFICE 2,218,463

DYNAMOMETER

Claude C. Bennett, South Bend, Ind., assignor to A. E. Feragen, Inc., Seattle, Wash., a corporation of Washington Application March 17, 1938, Serial No. 196,340

13 Claims. (Cl. 188—90)

This invention relates to dynamometers.

This application is a continuation in part of my application for Letters Patent on improvements in Absorption dynamometers, filed September 18, 1937, Serial Number 164,438, which has matured into Patent No. 2,189,189 dated Feb 6, 1940.

An object of the invention is to increase the efficiency of an absorption dynamometer, particularly the energy absorbing capacity thereof.

Another object of the invention is to provide an absorption dynamometer in which friction may be minimized.

Another object of the invention is to provide a dynamometer operative to build up any desired load, to maintain a true and steady torque, and to quickly dissipate the heat generated.

A further object of the invention is to provide a dynamometer having a transmission for effecting a change in the operative speeds thereof.

Other objects of the invention will become apparent from the ensuing description of an embodiment of the invention illustrated in the following drawings, in which—

Fig. 8 is a sectional view substantially on line 8—8, Fig. 2; and

Fig. 9 is a sectional view substantially on line 9—9, Fig. 2.

Figure 1:
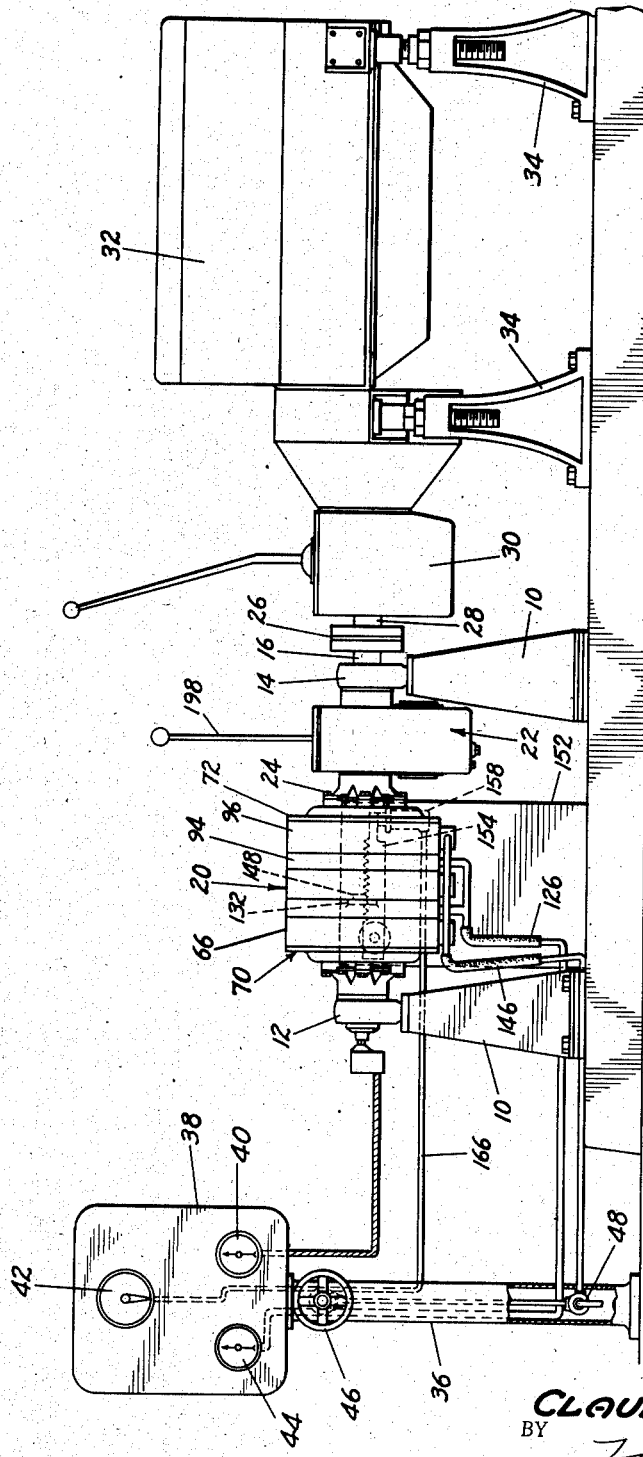
Fig. 1 is a diagrammatical view illustrating the dynamometer coupled to an engine under test.
Figure 2:
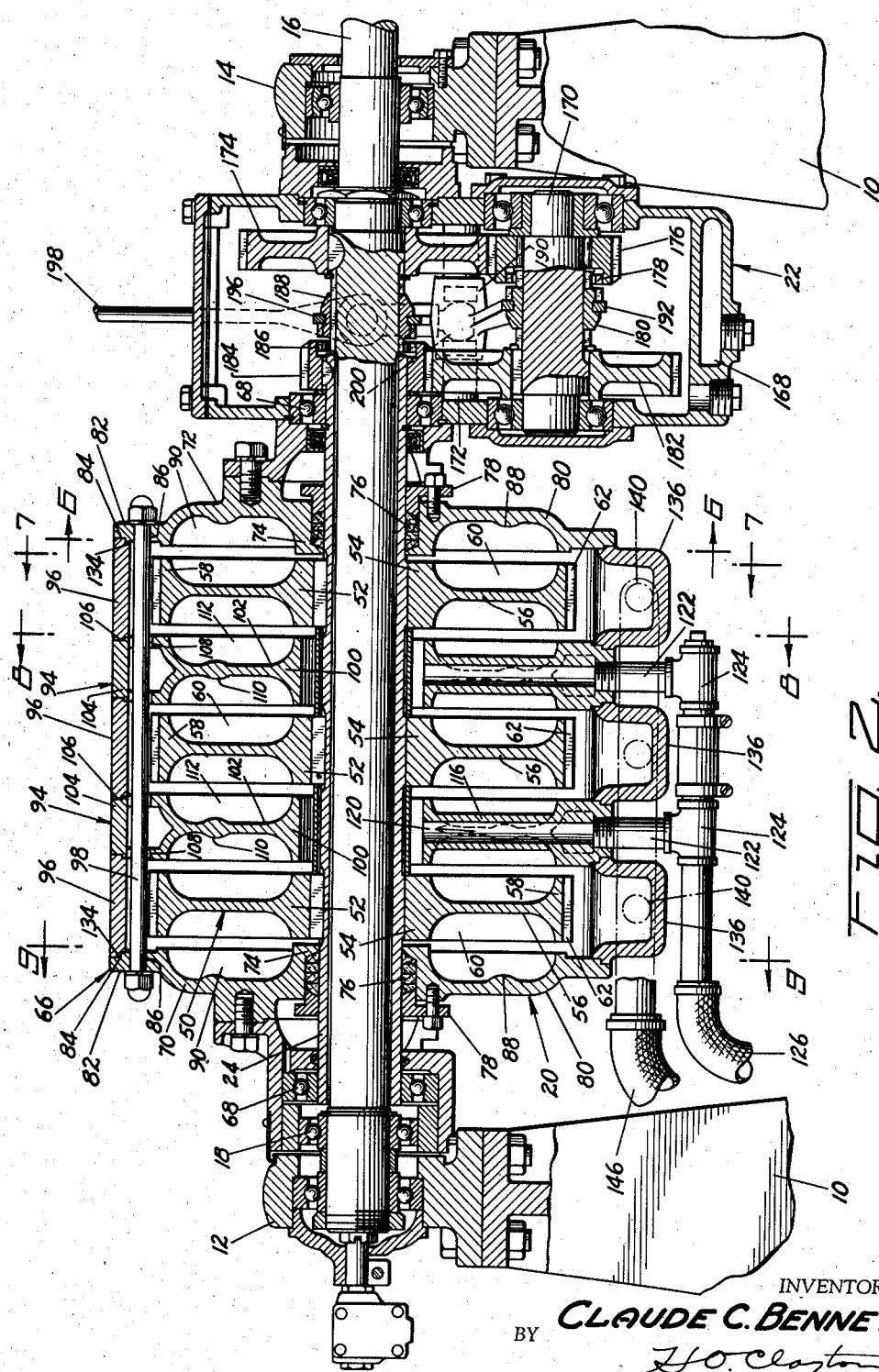
Fig. 2 is a vertical sectional view of a dynamometer embodying the invention.
Figure 3:
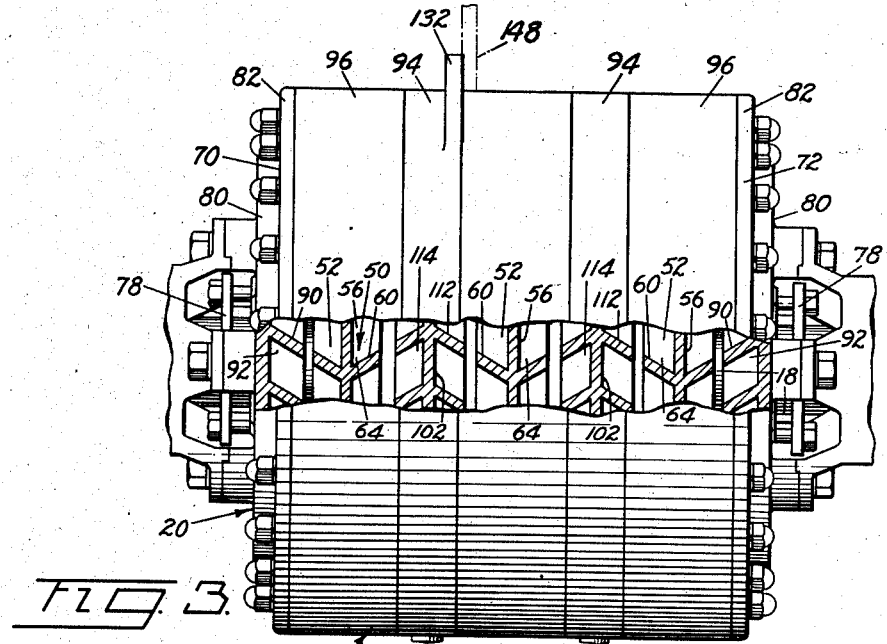
Fig. 3 is a side elevation of the dynamometer, partly broken away and partly in section.
Figure 4:
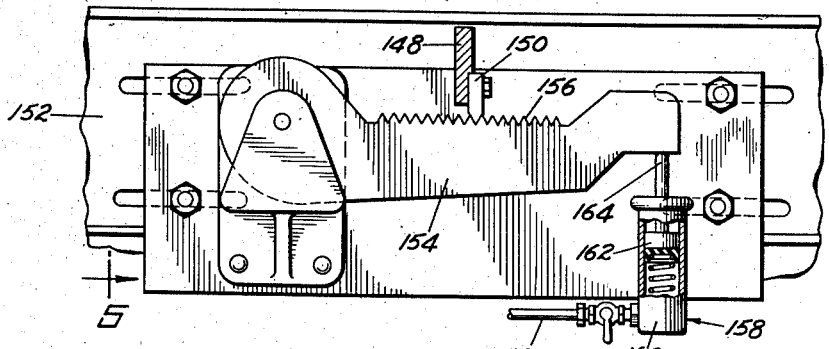
Fig. 4 is a side elevation of the torque transmitting apparatus.
Figure 5:
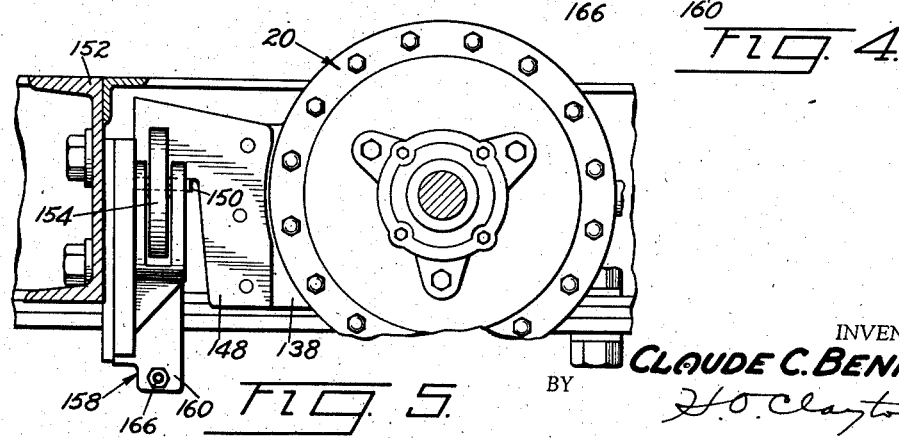
Fig. 5 is an end elevation of the dynamometer and torque transmitting mechanism.
Figures 6, 7:
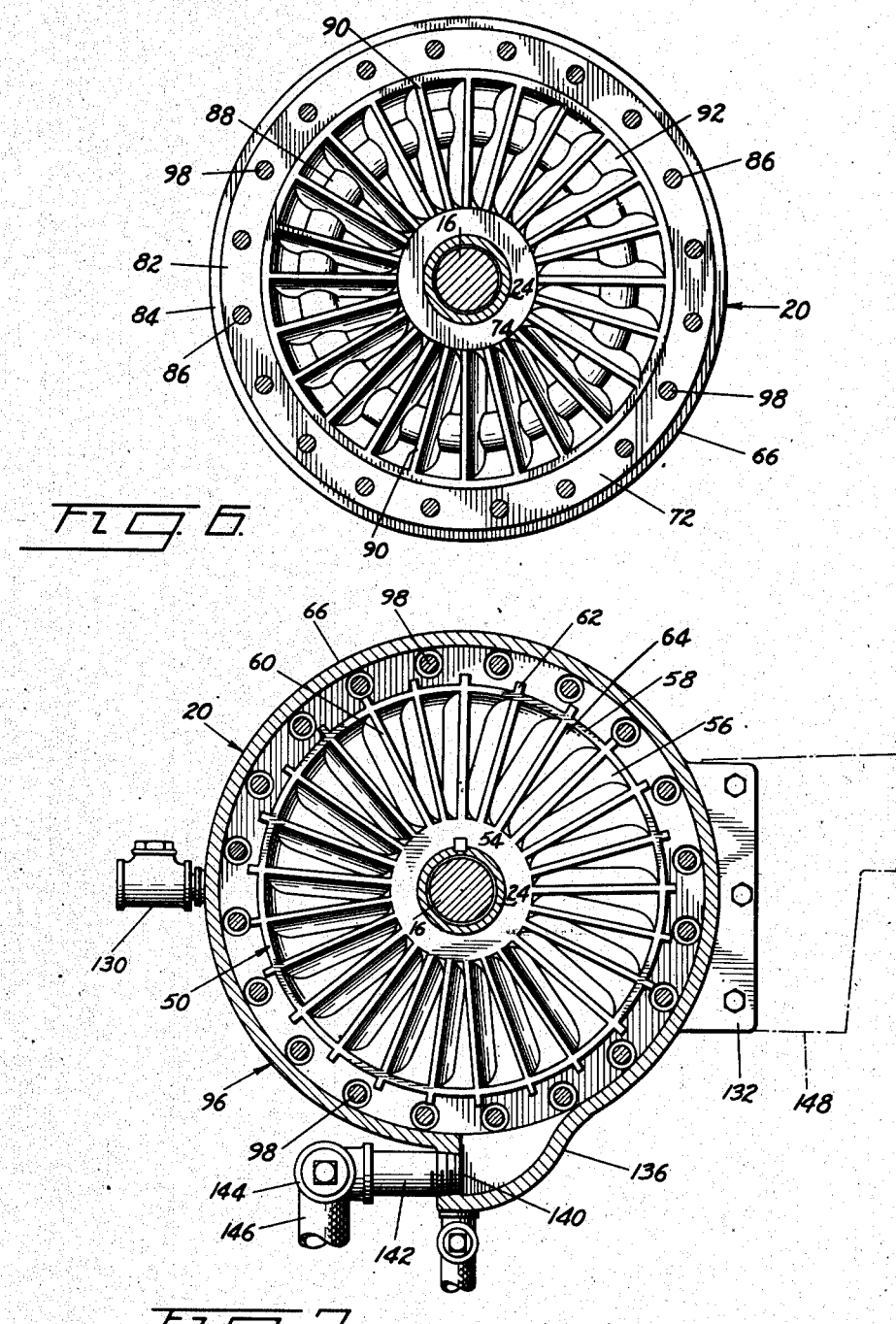
Fig. 6 is a sectional view substantially on line 6—6, Fig. 2.
Fig. 7 is a sectional view substantially on line 7—7, Fig. 2.

Referring to the drawings, 10 represents corresponding pedestals providing suitable supports for the unit. The pedestals have therein aligned bearings 12 and 14 supporting for rotation a shaft 16. The shaft has fitted thereon spaced bearings 18 supporting a combined absorption dynamometer 20 and transmission 22. The rotor of the dynamometer is fixedly secured to a sleeve 24 slipped over the shaft and suitably mounted in bearings carried by the dynamometer and transmission for rotation on an axis common to the shaft.

The shaft 16 is adapted to be coupled as by a universal joint 26 to a driven shaft 28 coupled through a conventional transmission 30 to the crank shaft of an engine 32 mounted on adjustable supports 34. A pedestal 36 supports an instrument board 38, and arranged on this board is a tachometer 40 suitably connected to the shaft 16 so as to indicate the speed of the shaft and, consequently, the speed of the engine. The board also has thereon a gauge 42, calibrated in units of torque and connected to the stator of the dynamometer, and a water gauge 44 connected in a water system controlled as by valves 46 and 48 and connected to the inlet and exhaust ports of the dynamometer.

The dynamometer 20 includes a rotor, indicated generally at 50. This rotor comprises a plurality of blades 52 arranged in spaced relation to one another on the sleeve 24 and suitably keyed to the sleeve. Each of the rotor blades includes a hub 54 having an axial bore for the reception of the sleeve 24, an annular web 56 formed centrally of the hub, a substantial rim 58 on the web, corresponding groups of radial vanes 60 arranged in oppositely disposed relation to one another on the respective sides of the web so that the vanes on both sides of the rotor are all inclined in the same direction as the direction of rotation of the blades. Each of the rotor blades also includes spaced transverse vanes 62 on the rim. The radial vanes 60 are formed integral with the hub, the web, and the rim, and extend outwardly from the web toward the opposite ends of the dynamometer 20 so as to provide pockets 64, and the edges of the vanes included in the respective groups are in planes common to the ends of the hub and the edges of the rim.

A stator, indicated generally at 66, encloses the rotor. The stator is mounted for oscillation on the bearings 18, and the rotor is secured to the sleeve 24 supported for rotation in bearings 68. The stator includes corresponding oppositely disposed end plates 70 and 72, each comprising a hub 74 having an axial bore for the reception of the sleeve 24, and a stuffing box 76 having therein suitable packing material and a packing ring 78 suitably secured against displacement.

The hub 74 has formed thereon at its outer end an annular plate 80 provided with a rim 82 in a plane substantially through the center of the hub, and the rim is provided with an annular shoulder 84 and a plurality of spaced openings 86. The inner face of the plate 80 is dished, and has formed thereon a raised portion 88, substantially semi-elliptical in cross-section, and a plurality of radial vanes 90 integral with the hub and rim providing in conjunction with the annular raised portion divided pockets 92. The radial vanes on the plate 70 are arranged in oppositely disposed relation to the radial vanes on the end plate 72, and the vanes of the respective end plates are reversely disposed to the vanes 60 on the adjacent rotor blades 52.

Stator plates 94 having blades and spacer rings 96 are arranged alternately between the end plates 70 and 72, and transverse rods 98, extending through the openings 86 in the rims of the end plates, aligned openings in the rims of the stator plates 94, and through the spacer rings, serve to fixedly secure these members together. Each of the stator plates 94 includes a hub 100 having an axial bore for the reception of the sleeve 24 with substantial clearance providing for free passage of fluid through the hub, and formed integrally with and centrally of the hub is a web 102 supporting a rim 104 having an annular shoulder 106 on its respective edges, the purpose of which will hereinafter appear, and spaced openings 108 for the reception of the rods 98.

The web 102 has an enlarged portion substantially elliptical in cross-section providing a semi-elliptical raised surface 110 on both sides of the web, and corresponding groups of radial vanes 112 formed on the respective sides of the web integral with the hub and the rim provide, in conjunction with the annular raised surfaces, divided pockets 114. The surfaces 88 and 110 are annular except where interrupted by the portions 70 and 112 respectively. The vanes 112 in the respective groups incline outwardly from the hub in directions reversely disposed to the vanes 60 on the adjacent rotor blades 52, and the edges of the vanes 112 in the respective groups are in planes common to the respective ends of the hub 100 and the respective edges of the rim 104.

The webs 102 of the stator blades are each provided with radial ribs 116 and 118. The rib 116 is bored to provide a fluid delivery passage 120 extending from the bore of the hub 100 through the rim 104, and secured in the outer end of this passage is a nipple 122 connected by suitable fittings 124 and a flexible hose 126 to the water system controlled by the valves 46 and 48. The other rib 118 has a bore providing an air intake passage 128 controlled as by a valve 130, and formed on the rim of one of the stator blades 94 is a flange 132 for a torque transmitting mechanism to be hereinafter described.

Each of the spacer rings 96 encircles one of the rotor blades 52, and each ring has on its respective edge corresponding annular shoulders 134 complementary to the annular shoulders of the adjacent end plate 70 or 72 and the annular shoulders on the adjacent stator blades so as to interlock and completely seal the stator casing. Each of the spacer rings 96 has an off-set portion 136 provided with an outlet opening 140 having secured therein a nipple 142 connected by suitable fittings 144 and a flexible hose 146 to a suitable drain.

A torque transmitting arm 148, bolted or otherwise secured to the flange 132 on the rim of one of the stator blades 94, has secured thereon adjacent its free end a blade 150, and adjustably mounted on a fixed support 152 is a pivoted arm 154 having a ratchet 156 receiving the blade 150. Arranged on the fixed support 152, beneath the free end of the pivoted arm 154, is a fluid pressure producing device 158 including a cylinder 160 and a piston 162 movable in the cylinder. The piston has a rod 164 engaged by the free end of the pivoted lever 154, and the cylinder is connected as by a fluid pressure delivery pipe 166 to the torque indicating gauge 42 on the instrument board.

The transmission 22 is of the two-speed type. As shown, the transmission includes a housing 168 mounted for oscillation with the dynamometer. A counter or jack shaft 170 is journaled in the wall of the housing, and suitably supported between the shaft 16 and the jack shaft 170 is a slide rail 172. A driving gear 174 keyed to the shaft 16 is in constant mesh with a pinion 176 rotatably supported on the jack shaft. The pinion has an internal gear 178, adapted to mesh with a slidable gear 180 splined to the jack shaft, and a gear 182 keyed to the jack shaft is in constant mesh with a gear 184 keyed to the sleeve 24. The gear 184 has an internal gear 186 adapted to mesh with a slidable gear 188 splined to the shaft 16. A yoke 190 slidable on the rail 172 has a fork 192 engaging the slidable gear 180 on the jack shaft and a fork 196 engaging the slidable gear 188 on the shaft 16, and a shifting lever 198 suitably secured to the yoke 190 as at 200 extends through the side of the casing.

By actuating the lever 198 the transmission may be shifted from low to high speed, or from high to low speed, at the will of the operator. As shown, the transmission is in the neutral position, from which it may be shifted to either the low speed position or to the high speed position. When it is desired to shift the transmission to the low speed position, the shifting rod is actuated to move the slidable gear 180 into engagement with the internal gear 178 on the pinion 176. This results in coupling the pinion 176 to the jack shaft 170 so as to complete the train of gearing from the shaft 16 and driving gear 174 keyed thereto through the pinion 176 and slidable gear 180 to the jack shaft 170, thence through the gear 182 keyed on the jack shaft to the gear 184 keyed on the sleeve 24. When shifting the transmission from the low speed to high speed position, the shifting lever is actuated to disengage the slidable gear 180 from the internal gear 178 of the pinion 176, and to engage the slidable gear 188 with the internal gear 186 of the gear 184 keyed on the sleeve 24 so that the sleeve may be coupled directly to the shaft 16.

In operation, the shaft 16 is connected at one end by the universal joint 26 to the crank shaft of an engine, a motor, or other apparatus such as for example the engine 32, the torque or other characteristics of which it is desired to test. The shaft supports a two-speed, or a single over-drive speed transmission 22 interlocked with the absorption dynamometer 20, and also supports drive gears 174 and 188 which may directly or indirectly engage gears 184 and 186 on the sleeve 24 carrying the rotor of the dynamometer. The other end of the shaft is suitably connected to the tachometer 40 for indicating the speed of the shaft, and, consequently, the speed of the engine. The stator of the dynamometer is connected to a suitable type of pressure gauge 42, preferably calibrated in units of torque, through a torque transmitting arm 148 secured to the stator, and a suitable fluid transmission means and a water supply system including the gauge 44 is suitably connected to the dynamometer.

When the dynamometer is connected to the engine and gauges as hereinabove described, the operator opens the outlet valve 48 and closes the inlet valve 46, and the engine 32 or the motor, or other apparatus under tests is then set in motion. After operating for a sufficient period of time to completely displace all fluid or water from the casing, the outlet is closed and the inlet gradually opened. The engine under test is then speeded up, and maintained at a constant rate of speed. The intake valve is then opened gradually until the torque gauge connected to the stator begins to indicate pressure.

When the water is admitted into the casing and distributed between the stator blades and rotor blades, it is projected by centrifugal force outwardly toward the periphery of the casing. Due to the vanes on the respective stator blades and rotor blades, and particularly to their opposed relation to one another, the water is agitated to a very high degree; and because of the structure of the stator blades, particularly the annular semi-elliptical surfaces on the respective sides thereof, providing in conjunction with the vanes divided pockets, back eddies of water are created resulting in intensifying the turbulence of the water.

As is well known, the friction between the water and the stator and rotor results in heating the water to a very high temperature, and it is by this means that the energy developed by the engine under test is absorbed by the dynamometer. When releasing the water from the resistance unit to decrease the torque or lower the power absorption thereof, it is desirable to effect a quick release, and to that end the rotor blades 52 are provided with transverse vanes 62 on their rims. It is to be understood that the transverse blades whirl the water at the outside of the hub at high speed and thus by centrifugal force efficiently expel the water through the offset portions 136. The release of the water from the unit may result in the creation of a partial vacuum, and to overcome this the stator blades are equipped with air inlets extending from the periphery to the center, and these are controlled by air valves 130. The load on the engine may be varied by operating the inlet and outlet control valves of the water system, and the speed of the engine may be governed by operating the conventional engine controls, and, through the medium of a definitely fixed water flow through the inlet and outlet valves, the heat is dissipated, permitting a continuous test over an unlimited period of time.

The resistance or load on the engine may be varied by regulating the rate of discharge of water from the dynamometer, or by regulating the rate of admission of water into the dynamometer, or by shifting the transmission to change the rate of speed of the rotor blades of the dynamometer.

In completing the test, the engine is operated with wide-open throttle and the control of the dynamometer set so as to maintain a constant resistance or load on the engine. Under these conditions, the operator takes a reading of the tachometer and of the torque gauge, and with these two factors known, the horse power of the engine may be computed in accordance with established practice.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is—

1. A dynamometer comprising a rotatable shaft, a sleeve slipped over the shaft and supported for rotation relative thereto on an axis common to the shaft, corresponding end plates oscillable on the shaft, radial vanes on the end plates, a plurality of corresponding stator blades, radial vanes on the sides of the stator blades, spacer rings alternating with the stator blades, the stator blades and spacer rings interlocking with one another and with the end plates and providing in conjunction therewith a housing adapted to contain fluid having inlets and outlets, rotor blades secured to the sleeve alternating with the stator blades, means on the peripheries of the rotor blades for expelling fluid from the housing, and means controlling the inlets and outlets.

2. A dynamometer comprising a rotatable shaft, a sleeve slipped over the shaft and supported for rotation on an axis common to the shaft, spaced annular end plates oscillable on the shaft, radial vanes on the end plates extending toward the center of the dynamometer therefrom, the vanes on the end plates being inclined both to planes passing perpendicular to and through the shaft axis, an assembly of stator blades and spacer rings clamped between the end plates and providing in conjunction therewith a housing, each of the spacer rings having a discharge port, radial vanes on the stator blades inclined outwardly therefrom, the vanes on one side of the stator blades being reversely disposed to the vanes on the other side thereof, each of the stator blades having a fluid intake passage and an air intake passage, both passages extending from the periphery of the blade inwardly and opening adjacent the sleeve, rotor blades secured to the shaft alternating with the stator blades, radial vanes on the sides of the rotor blades inclined outwardly, the vanes on one side being reversely disposed to the vanes on the other side, spaced transverse vanes on the rims of the rotor blades, valves controlling the air inlets, and means for controlling the fluid inlet and outlet.

3. A dynamometer comprising a rotatable shaft; a sleeve slipped over the shaft and supported for relative rotation on an axis common to the shaft; a stator comprising corresponding end plates oscillatable on the shaft, an assembly of stator blades and spacer rings arranged alternately between the end plates and providing in conjunction therewith a housing for containing fluid having inlets and outlets; a rotor comprising rotor blades keyed to the sleeve and alternating with the stator blades, transverse vanes on the rims of the rotor blades dispelling fluid from the housing; means for controlling the inlets and the outlets; and means for coupling the shaft and the sleeve.

4. A dynamometer comprising a rotatable shaft; a sleeve slipped over the shaft and supported for relative rotation on an axis common to the shaft; a stator comprising corresponding end plates oscillable on the shaft, radial vanes on the end plates extending towards the center of the dynamometer, the vanes on the end plates being inclined both to planes passing perpendicular to and through the shaft axis, an assembly of stator blades and spacer rims clamped between the end plates and providing in conjunction therewith a housing having inlets and outlets, radial vanes on both sides of the stator blades; a rotor comprising rotor blades on the sleeve alternating with the stator blades, radial vanes on the rotor blades reversely disposed to the vanes on the adjacent stator blades, and transverse vanes on the rims of the rotor blades for rapid displacement of fluid from the housing; means for controlling the inlets and outlets; and means for coupling the shaft and the sleeve.

5. A dynamometer comprising a rotatable shaft; a sleeve slipped over the shaft and supported for relative rotation on an axis common to the shaft; a stator oscillable on the shaft comprising corresponding end plates rotatable on the shaft, radial vanes on the end plates extending therefrom toward the center of the dynamometer, the vanes on the end plates being inclined both to planes passing perpendicular to and through the shaft axis, an assembly of stator blades and spacer rings clamped between the end plates and providing in conjunction therewith a housing having inlets and outlets, and radial vanes on both sides of the stator blades; a rotor secured to the sleeve comprising rotor blades on the shaft alternating with the stator blades, radial vanes on the rotor blades extending outwardly from the blades towards the end of the dynamometer and inclined both to planes passing perpendicular to and through the shaft axis, and transverse vanes on the rims of the rotor blades for displacing fluid from the housing through the outlets; means for controlling the inlets and outlets; and means for coupling the shaft and the sleeve.

6. A dynamometer comprising a rotatable shaft, a case directly carried by and supported for oscillation on the shaft and having inlets and outlets, a plurality of spaced stator blades in the case, a sleeve slipped over the shaft and supported for rotation on the case, rotor blades secured to the sleeve for cooperation with the stator blades, and means for control of the inlets and outlets.

7. A dynamometer comprising a shaft supported for rotation, a case supported for oscillation on the shaft and having fluid inlets and outlets, a plurality of spaced stator blades in the case, a sleeve slipped over the shaft and supported for rotation on the case, a plurality of rotor blades secured to the sleeve alternating with the stator blades, vanes on the periphery of the rotor blades for rapidly displacing fluid from the case, and means for control of the inlets and outlets.

8. A dynamometer comprising a shaft supported for rotation, a case directly carried by and supported for oscillation on the shaft and having controlled fluid inlets and outlets, a plurality of spaced stator blades in the case, a sleeve slipped over the shaft and supported for rotation on the case, a plurality of rotor blades secured to the sleeve alternating with the stator plates, and spaced vanes on the periphery of the rotor plates for rapid displacement of fluid from the case through the fluid outlets.

9. A dynamometer comprising a shaft supported for rotation, a case supported for oscillation on the shaft, fluid outlets in the wall of the case, a plurality of stator blades secured in the wall of the casing, fluid inlets extended radially through the stator blades and opening adjacent the centers thereof, a sleeve slipped over the shaft and supported for rotation on the case, rotor blades secured to the sleeve in alternate relation to the stator blades, spaced vanes on the peripheries of the rotor blades for rapid uninterrupted displacement of fluid from the case through the outlets, and means for control of the inlets and outlets.

10. A dynamometer comprising a shaft supported for rotation, a case supported for oscillation on the shaft, a plurality of stator blades in the case, fluid inlets discharging substantially centrally of the case, an air inlet discharging substantially centrally of the case, fluid outlets in the wall of the case, means for control of inlets and outlets, a sleeve slipped over the shaft and supported for rotation on the case, a plurality of rotor blades secured to the sleeve in alternate relation to the stator blades, and spaced vanes on the peripheries of the rotor blades for rapid displacement of fluid from the casing upon opening of the fluid outlets.

11. A dynamometer comprising a shaft supported adjacent its ends for axial rotation, a case carried by and supported for oscillation on the shaft, a plurality of stator blades in the case having vanes on their sides, an air inlet discharging through the stator blades substantially centrally of the case, fluid inlets discharging through the stator blades substantially centrally of the case, fluid outlets in the wall of the case, means for control of the inlets and outlets, a sleeve slipped over the shaft and supported for rotation on the case, a plurality of rotor blades secured to the sleeve alternating with the stator blades and having vanes on their sides opposed to the vanes on the sides of the stator blades, and spaced vanes on the peripheries of the rotor blades adapted to rapidly sweep fluid from the casing upon opening of the outlets.

12. A dynamometer comprising a rotatable shaft, a casing having fluid inlet and outlet means carried by and directly supported for oscillation on the shaft, a plurality of spaced stator blades in the casing, a sleeve associated with the shaft and supported for rotation on the casing, rotor blades secured to the sleeve for cooperation with the stator blades, and means for controlling the fluid inlet and outlet means.

13. A dynamometer comprising a rotatable shaft, a casing having fluid inlet and outlet means carried by and directly supported for oscillation on the shaft, a plurality of spaced stator blades in the casing, a rotatable element associated with the shaft and supported for rotation on the casing, rotor blades secured to the rotatable element for coperation with the stator blades, means for controlling the fluid inlet and outlet means, and manually operable speed varying means to control the speed of rotation of the rotatable element to vary the power absorbed by the dynamometer.

CLAUDE C. BENNETT.